US012658347B2

(12) United States Patent
Langtry

(10) Patent No.: US 12,658,347 B2
(45) Date of Patent: Jun. 16, 2026

(54) SUPERCONDUCTOR ELECTROMAGNET

(71) Applicant: Tokamak Energy Ltd, Abingdon (GB)

(72) Inventor: Tony Langtry, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 733 days.

(21) Appl. No.: 17/998,699

(22) PCT Filed: May 14, 2021

(86) PCT No.: PCT/EP2021/062844
§ 371 (c)(1),
(2) Date: Nov. 14, 2022

(87) PCT Pub. No.: WO2021/229062
PCT Pub. Date: Nov. 18, 2021

(65) Prior Publication Data
US 2023/0307149 A1 Sep. 28, 2023

(30) Foreign Application Priority Data
May 15, 2020 (GB) ..................................... 2007245

(51) Int. Cl.
*H01F 6/06* (2006.01)
*G21B 1/05* (2006.01)

(52) U.S. Cl.
CPC ............... *H01F 6/06* (2013.01); *G21B 1/057* (2013.01)

(58) Field of Classification Search
CPC ........................................................ H01F 6/06
See application file for complete search history.

(56) References Cited

U.S. PATENT DOCUMENTS 3,736,539 A 5/1973 File et al.
4,330,726 A 5/1982 Albright et al.
2010/0323900 A1 12/2010 Kawashima
(Continued)

FOREIGN PATENT DOCUMENTS

CN 206312653 U 7/2017
GB 2510447 A 8/2014
(Continued)

OTHER PUBLICATIONS

International Preliminary Report on Patentability for Related Application No. PCDT/EP2021/062844 dated Nov. 24, 2022 (10 pages).
(Continued)

*Primary Examiner* — Paul A Wartalowicz
(74) *Attorney, Agent, or Firm* — Michael Best & Friedrich LLP

(57) ABSTRACT

An electromagnet comprising having one or more channels. Each channel has provided therein a conductor element comprising one or more layers of superconductor material for conducting electrical current along an axis of the channel. The conductor element is arranged to contact sidewalls of the channel through first and second wedge surfaces that are inclined with respect to one another such that a force biasing the conductor element in a direction perpendicular to the axis generates opposing contact forces on the wedge surfaces that act to compress the conductor element along a direction with a component perpendicular to the force.

20 Claims, 4 Drawing Sheets

(56) References Cited

U.S. PATENT DOCUMENTS

| | | | | |
|---|---|---|---|---|
| 2012/0053060 | A1 * | 3/2012 | Shinzato | F17C 13/00<br>505/211 |
| 2014/0175796 | A1 * | 6/2014 | Rasmussen | F03D 9/255<br>307/151 |
| 2016/0094096 | A1 | 3/2016 | Hunstable | |
| 2016/0247615 | A1 | 8/2016 | Gupta et al. | |
| 2017/0047821 | A1 * | 2/2017 | Klassen | H02K 5/16 |
| 2017/0337989 | A1 | 11/2017 | Wong | |
| 2019/0252104 | A1 | 8/2019 | Slade | |

FOREIGN PATENT DOCUMENTS

| | | | |
|---|---|---|---|
| GB | 2570666 | A | 8/2019 |
| JP | S5538260 | U | 3/1980 |
| JP | S5673896 | A | 6/1981 |
| JP | 57106008 | A | 7/1982 |
| JP | S57106008 | A * | 7/1982 |
| KR | 101640869 | B1 | 7/2016 |
| KR | 101658727 | B1 | 9/2016 |
| KR | 101694391 | B1 | 1/2017 |
| RU | 2022374 | C1 | 10/1994 |
| RU | 2051433 | C1 | 12/1995 |
| RU | 2686524 | C1 | 4/2019 |

OTHER PUBLICATIONS

Russian Patent Office Action for Application No. 2022132468/07(070774) dated Jun. 18, 2024 (5 pages including English translation).
Japanese Patent Office Action for Application No. 2022568514 dated Apr. 1, 2025 (6 pages including English translation.
Great Britain Patent Office Search Report for Related Application No. GB2007245.0 dated Jul. 31, 2020 (4 pages).
International Search Report and Written Opinion for Related Application No. PCT/EP2021/062844 dated Aug. 19, 2021 (16 pages).
Chinese Patent Office Action for Application No. 202180034880.2 dated Nov. 24, 2025 (8 pages including English translation).

* cited by examiner

SUPERCONDUCTOR ELECTROMAGNET

CROSS-REFERENCE TO RELATED APPLICATION(S)

This application is a national phase entry of PCT/EP2021/062844, filed on May 14, 2021, which claims priority to GB 2007245.0, filed on May 15, 2020, the entire contents of each of which are fully incorporated herein by reference.

TECHNICAL FIELD

The present invention relates to electromagnets comprising superconductor material. In particular, but not exclusively, it relates to electromagnets for use in plasma chambers, such as those used in tokamak fusion reactors, e.g. electromagnets used in a central column of a toroidal field coil for a tokamak plasma chamber.

BACKGROUND

A tokamak features a combination of strong toroidal magnetic field, high plasma current and, usually, a large plasma volume and significant auxiliary heating, to provide hot, stable plasma. This allows tokamaks to generate conditions so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

A problem is that, because of the large size, large magnetic fields, and high plasma currents generally required, build costs and running costs are high and the engineering has to be robust to cope with the large stored energies present, both in the magnet systems and in the plasma, which has a risk of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham, UK demonstrated a huge increase in efficiency—the magnetic field required to contain a hot plasma can be reduced by a factor of 10. In addition, plasma stability is improved, and building costs reduced.

To obtain the fusion reactions required for economic power generation (i.e. much more power out than power in), a conventional tokamak would have to be huge so that the energy confinement time (which is roughly proportional to plasma volume) can be large enough that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement vessel and associated magnets.

The magnet coils on a tokamak can be divided into two groups. The poloidal field coils are horizontal circular coils wound with their centre lying on the central column of the tokamak, and produce a poloidal field (i.e. one which is substantially parallel to the central column). The toroidal field coils are wound vertically through the central column, and around the outside of the plasma chamber (the "return limbs") to produce a toroidal field (i.e. one which is circular around the central column). The combination of the poloidal and toroidal fields produces a helical field within the plasma chamber which keeps the plasma confined.

The electrical currents required in the toroidal field are very large. For a compact spherical tokamak, the central column should be as small in diameter as possible. This presents conflicting requirements, as the current density that can be achieved, even with superconducting materials, is limited.

The large electrical currents, in combination with the large magnetic fields in a tokamak generate large Lorentz forces that may deform or otherwise damage parts of the tokamak.

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS and LTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diboride ($MgB_2$).

ReBCO is typically manufactured as tapes, which are generally approximately 100 microns thick, and include a substrate (typically electropolished hastelloy approximately 50 microns thick), on which is deposited by IBAD, magnetron sputtering, or another suitable technique a series of buffer layers known as the buffer stack of approximate thickness 0.2 microns. An epitaxial ReBCO-HTS layer (deposited by MOCVD or another suitable technique) overlays the buffer stack, and is typically 1 micron thick. A 1-2 micron silver layer is deposited on the HTS layer by sputtering or another suitable technique, and a copper stabilizer layer is deposited on the tape by electroplating or another suitable technique, which often completely encapsulates the tape.

The substrate provides a mechanical backbone that can be fed through the manufacturing line and permit growth of subsequent layers. The buffer stack is required to provide a biaxially textured crystalline template upon which to grow the HTS layer, and prevents chemical diffusion of elements from the substrate to the HTS which damage its superconducting properties. The silver layer is required to provide a low resistance interface from the ReBCO to the stabiliser layer, and the stabiliser layer 105 provides an alternative current path in the event that any part of the ReBCO ceases superconducting (enters the "normal" state).

Commercially available HTS tapes start to degrade at internal stresses larger than about 400 MPa.

SUMMARY

It is an object of the present invention to provide a central column for a toroidal field coil that addresses, or at least alleviates, the problems described above.

According to a first aspect of the present invention there is provided an electromagnet comprising one or more channels. Each channel has provided therein a conductor element comprising one or more layers of superconductor material for conducting electrical current along an axis of the channel. The conductor element is arranged to contact sidewalls of the channel through first and second wedge surfaces that are inclined with respect to one another such that a force biasing the conductor element in a direction perpendicular to the axis (e.g. into the channel) generates opposing contact forces on the wedge surfaces that act to compress the conductor element along a direction with a component perpendicular to the force.

The electromagnet may be configured so that stress generated during operation of the electromagnet does not exceed a threshold stress associated with the superconductor material. The threshold stress may be, for example, determined based on a degradation of the HTS material and/or a degradation of the HTS material's ability to function as a superconductor.

The or each channel may be an "open" channel such that the conductor element is not encircled by the walls of the channel. Alternatively, the channel may be "closed", such the walls of the channel surround the conductor element, e.g. the channel may be a through hole in the support member.

In some cases, the electromagnet may have a central axis, with the axes of the one or more channels being arranged parallel to the central axis. In this case, the one or more layers of superconductor material are arranged to conduct electrical current parallel to the central axis. The force biasing the conductor element in a direction perpendicular to the axis may be directed towards the central axis.

Each conductor element may comprise one or more stacks of High Temperature Superconductor, HTS, tapes, each HTS tape including a layer of HTS material extending along the channel. The HTS material may be ReBCO.

Each conductor element may comprise a wedge member provided between the stack of HTS tapes and one of the sidewalls of the channel, the first wedge surface being provided on the wedge member. The wedge member may be fixed to the stack of HTS tapes.

The wedge member comprises a surface in contact with the stack that is substantially perpendicular to the layers of HTS material.

For one or more of the conductor elements, an acute angle between the first wedge surface and the surface in contact with the stack may be greater than 1 degree, greater than 3 degrees, or greater than 5 degrees.

Each conductor element may comprise another wedge member attached to the one or more stacks of HTS tapes, the second wedge surface being provided on the other wedge member.

A static friction coefficient between each of the wedge surfaces of the conductor element and the sidewalls of the channel may be from 0.1 to 0.3, or greater than 0.3, or greater than 0.4.

Each of the conductor elements may be potted.

The electromagnet may further comprise a support member, the channels being provided in the support member. The support member may comprise one or more through holes extending in a direction having a component parallel to one or more of the channels. The one or more through holes may be located adjacent to one or more of the sidewalls of the channel. The one or more through holes may be used for cooling the electromagnet.

According to a second aspect of the present invention there is provided a central column for a toroidal field coil of a tokamak plasma chamber. The central column comprises a plurality of electromagnets according to the first aspect of the present invention. The channels are spaced around a central axis and the one or more layers of superconductor material are arranged for conducting electrical current parallel to the central axis. The force is a radial force biasing the conductor element towards the central axis.

The channels may be provided in a single support member.

The central column may comprise one or more holes through the or each support member, each hole extending parallel to the central axis. The one or more holes may be located radially outwards of a radially inner edge of the conductor element. The holes may be used for cooling the central column, e.g. by flowing a cooling fluid through the holes. Despite the one or more holes, the toroidal field coil(s) may be operated without causing the central column to deform as a result of lower internal stresses in the central column compared to known designs of central columns.

The or each support member may comprise one or more removable angular segments, each angular segment comprising one or more of the plurality of channels.

According to a third aspect of the present invention there is provided a central column for a toroidal field coil of a tokamak plasma chamber. The central column comprises a support member having a plurality of channels spaced around a central axis. Each channel has provided therein a conductor element comprising one or more layers of superconductor material for conducting electrical current parallel to the central axis. The conductor element is arranged to contact sidewalls of the channel through first and second wedge surfaces that are inclined with respect to one another such that a radial force biasing the conductor element towards the central axis generates opposing contact forces on the wedge surfaces that act to compress the conductor element along a direction with a component perpendicular to the radial force.

Each conductor element may comprise one or more stacks of High Temperature Superconductor, HTS, tapes, each HTS tape including a layer of HTS material extending parallel to the central axis.

The HTS material may be ReBCO.

The layers of HTS material in each stack may be substantially perpendicular to a radial line extending from the central axis in a plane transverse to the central axis and passing through the corresponding conductor element.

For one or more of the conductor elements, an acute angle between the first wedge surface and the radial line may be greater than 1 degree, greater than 3 degrees, or greater than 5 degrees.

Each conductor element may comprise a wedge member attached to the stack of HTS tapes, the first wedge surface being provided on the wedge member. Each conductor element may comprise another wedge member attached to the one or more stacks of HTS tapes, the second wedge surface being provided on the other wedge member.

A static friction coefficient between each of the wedge surfaces of the conductor element and the sidewalls of the channel may be from 0.1 to 0.3, or greater than 0.3, or greater than 0.4.

The central column may comprise one or more holes through the support member extending parallel to the central axis. The one or more holes may be located radially outwards of a radially inner edge of the conductor element.

The support member may comprise one or more removable angular segments, each angular segment comprising one or more of the plurality of channels.

The conductor element may be potted.

According to a fourth aspect of the present invention there is provided a toroidal field coil for a tokamak, the toroidal field coil comprising a central column according to the first, second or third aspect.

According to a third aspect of the present invention there is provided a tokamak comprising a toroidal field coil according to the fourth aspect.

DETAILED DESCRIPTION

Figure 1A:
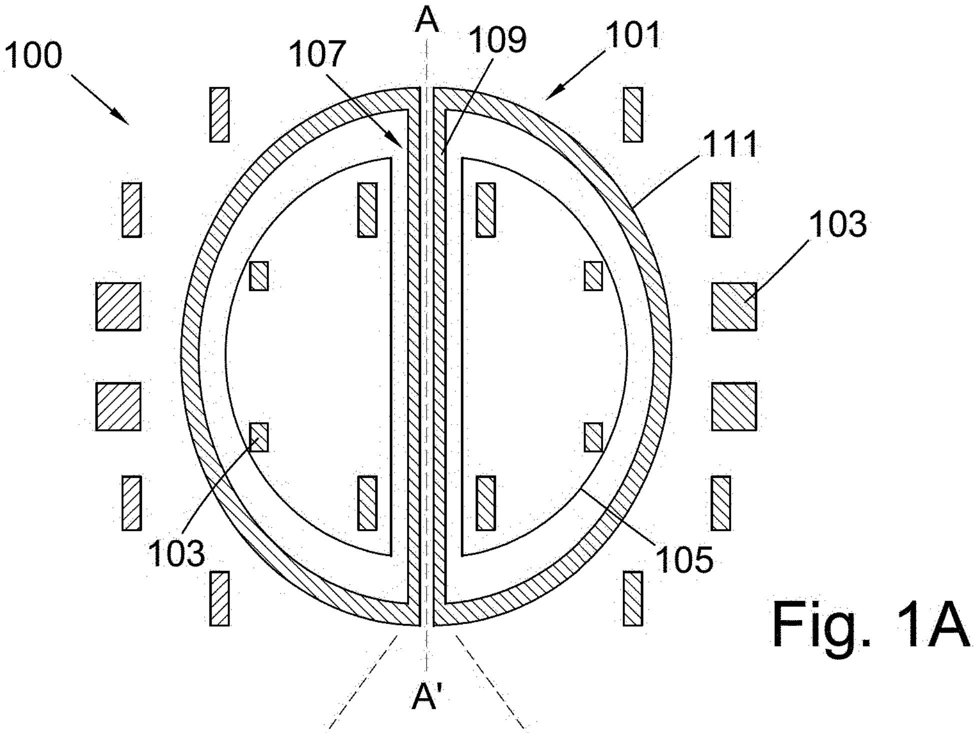
FIG. 1A is a schematic cross section view of a tokamak.

FIG. 1A shows a vertical cross section through a spherical tokamak 100 comprising toroidal field coils 101, poloidal field coils 103 and a toroidal plasma chamber 105 located within the toroidal field coils 101. The tokamak 100 also comprises a central column 107, which extends through the centres of the plasma chamber 105 and the toroidal 101 and poloidal 103 field coils. Each of the toroidal field coils 101 comprises a straight section 109 that extends along the axis A-A' of the central column 107 and a curved section 111 that is electrically connected to either end of the straight section 109 to form a closed loop.

Figure 1B:
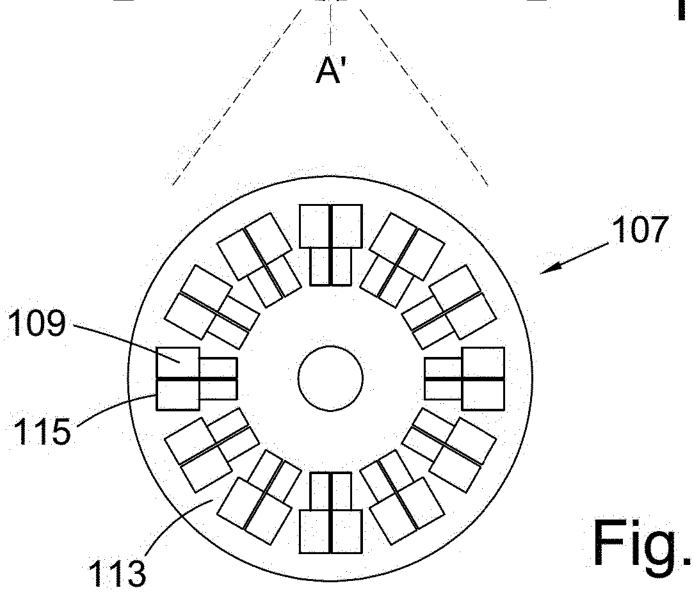
FIG. 1B is a schematic axial cross section view of the central column of the tokamak of FIG. 1.

FIG. 1B shows an axial cross section of the central column 107 viewed looking along the axis A-A'. The tokamak 100 in this example comprises 12 toroidal field coils 101 and the respective straight portions 109 of each of the toroidal field coils 101 are angularly spaced about the axis A-A' of the central column 107 in an equiangular arrangement. The central column comprises a support member 113 made from copper (although other metals and/or alloys can be used) that extends along the axis A-A' and which has a plurality of channels 115 in which the straight sections 109 of the toroidal field coils 111 are housed. The straight portions 109 each comprise a stacked arrangement of lengths of HTS tape extending along the central column 107 and are arranged to contact one another through their respective faces. The HTS layers of the tapes run parallel to the axis A-A'.

Figure 2:
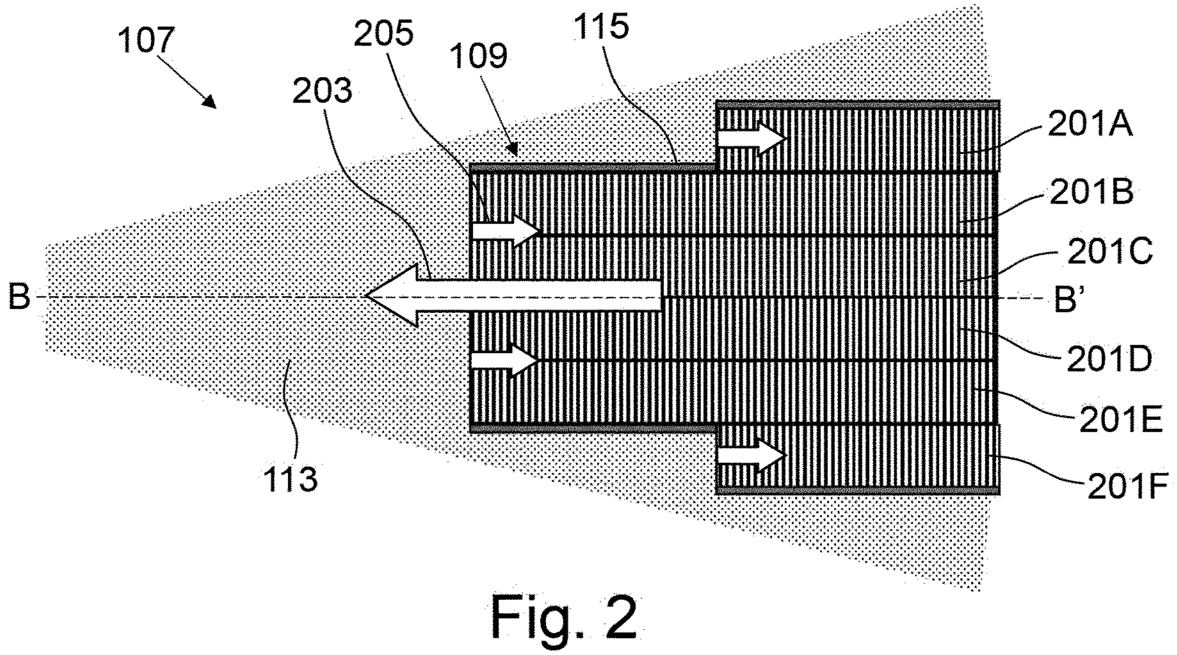
FIG. 2 is a schematic axial cross section view of an angular segment of a central column of a toroidal field coil.

FIG. 2 is an axial cross section of an angular segment of the central column 107 showing one of the straight portions 109 of one of the toroidal field coils 101. In this example, the straight portion 109 comprises six stacks of HTS tapes 201A-F with four inner stacks 201B-E having the same thickness as one another (i.e. the same length in a direction along a radial line B-B' of the central column 107 which passes through the centre of the straight portion 109 and is transverse to the tapes) provided between two outer stacks 201A, F, which each have a smaller thickness than the inner stacks 201B-F. The stacks 201A-F are bonded to one another with their radially outermost edges aligned. Each channel 115 has a cross sectional profile that corresponds to the outline (i.e. the shape of the perimeter in the cross-section of the channel 115 perpendicular to line A-A') of the corresponding straight section 109 of the toroidal field coil 101.

In use, the stacks of HTS tape 201A-F carry axial electrical current in an azimuthal magnetic field, and hence experience a Lorentz force 203 acting towards the centre of the column 107 (i.e. along the radial direction indicated by the broken line B-B'). These Lorentz forces act radially on the HTS tapes 201A-F to compress them against the support member 113 of the central column 107, thereby creating contact forces 205 between the radially innermost edges of the stacks of HTS tape 201A-F and the walls of the channel 115. The combination of the Lorentz force 203 and the contact forces 205 therefore generates compressive stress within the HTS tape 201A-F that may damage the HTS tapes 201A-F or otherwise decrease their ability to carry large electrical currents.

Figure 3:
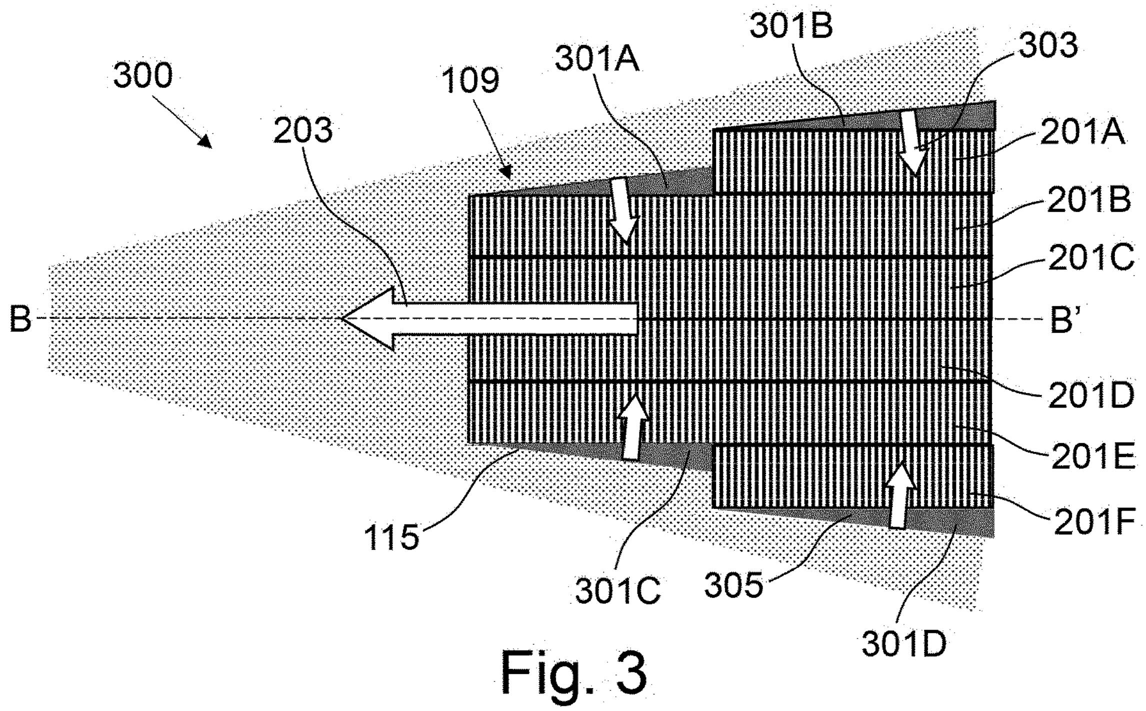
FIG. 3 is a schematic axial cross section view of a part of an angular segment of a central column of a toroidal field coil according to the present invention.

FIG. 3 is similar to FIG. 2 except that is shows a central column 300 in which wedge members 301A-D are fixed to the outermost faces of the stacks 201A, B, 201E, 201F, to form circumferentially-outer portions of the straight portions 109 of the toroidal field coils 101. The channels 115 through the support member 113 are enlarged to accommodate the increased size of the straight portions 109. The wedge members 301A-D in this example are triangular prisms that extend with translational symmetry parallel to the axis A-A'. The triangles which form the cross-section of the wedge members may be substantially right angled triangles, and the wedge members may be arranged such that the largest, outer face of the each prism (i.e. the hypotenuse of the triangular cross-section) is directed away from the HTS tapes 201A-F, with the narrower (pointed) end of the prism being located radially inwards of the wider end of the prism (i.e. the side of the triangle furthest from the most acute angle of the triangle). That is, the wedge members 301A-D taper radially inwardly along direction B-B'. Each of the channels 115 also tapers radially inwardly so that the sidewalls of the channel 115 are parallel to the corresponding outer faces of the wedge members 301A-D.

Indeed the sidewalls of the channel 115 lie against the corresponding outer faces of the wedge members 301A-D. In this example, the wedge angle 305 (the interior angle between the two largest faces of the wedge member 301A-D, at the narrower end of the prism) is 5 degrees.

In use, the Lorentz force 203 acting radially on the straight section 109 of the HTS tapes 201A-F generates contact forces 303 between the outer face of the wedge members 301A-D and the sidewalls of the channel 115. The contact forces 303 are oriented normal to the outer face of the wedge members 301A-D, i.e. the contact forces 303 have a radial component (directed along the radial axis B-B') and a circumferential component (directed towards the radial axis B-B'). The wedge members 301A-D therefore provide a mechanism whereby radial stress within the central column 101 is exchanged for hoop stress, i.e. the radial stress within central column is decreased while the hoop stress increases. This trade-off allows the stacks of HTS tapes 201A-F to conduct higher currents without causing mechanical damage to the HTS tape.

Figure 4:
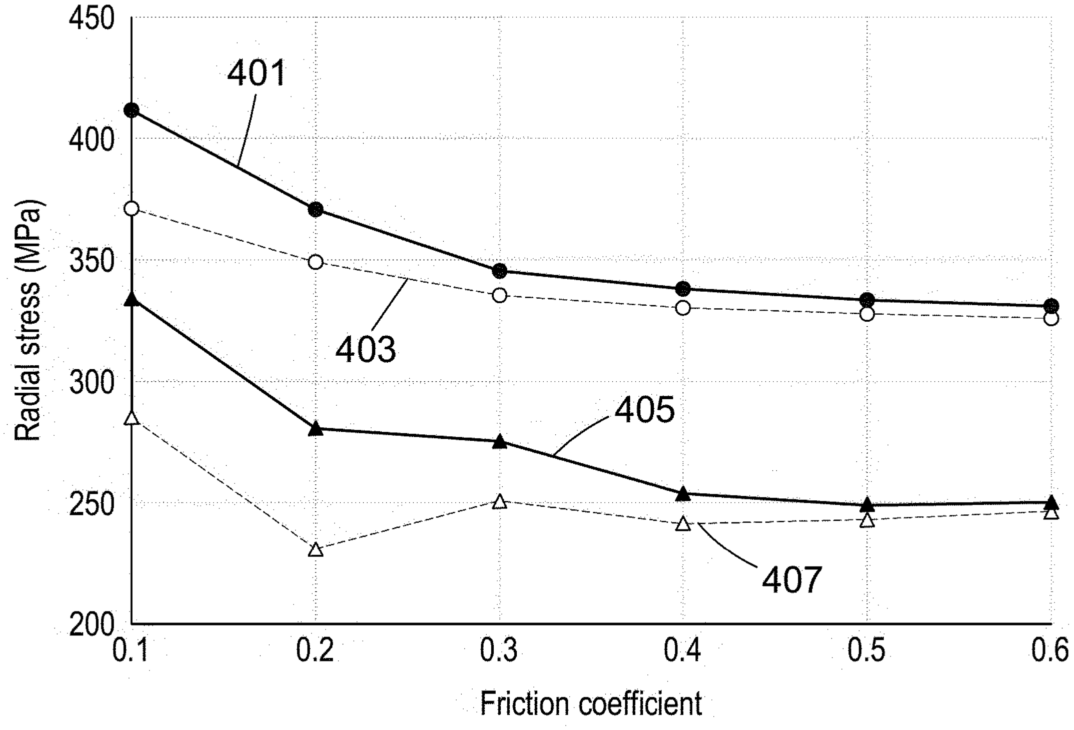
FIG. 4 is a graphical plot of the results of a Finite Element Method (FEM) calculation of the radial stress (normal stress) for different wedge angles and friction coefficients.

FIG. 4 shows a graphical plot of the results of a finite element method (FEM) calculation of the radial stress generated within the stacks of HTS tapes 201A-F when the tokamak is operated with a current of 28 MA passing through the central column 101. This current leads to a peak magnetic field of 26.9 T at the radially outermost edges of the HTS tapes 201A-F. The magnetic field decays monotonically away from the central column 101 and has a magnitude of 4 T at a distance of 1.4 m from the central column 101. The plotted results show the radial stress in MPa (vertical, Y axis) in the coils as a function of the friction coefficient (horizontal, X axis) between the outer face of the wedge members 301A-B and the corresponding sidewalls of the channel 115.

The two uppermost sets of data points 401, 403 (shown as filled circles) indicate the calculated radial stress in the outer stacks 201A, F for wedge angles of 1 degrees and 5 degrees respectively (the same wedge angle being used for each wedge member 301A-D). These results show that the radial stress is lower for the larger wedge angle and that for both angles, increasing the friction coefficient reduces the radial stress monotonically by progressively smaller amounts. Similar results (not shown) are obtained for other angles in the range from 1 degrees to 5 degrees, with the calculated radial stresses having values that are intermediate between the radial stresses for the sets of data points 401, 403. Angles greater than 5 degrees can also be used, e.g. angles up to any one of 10 degrees, 30 degrees, 45 degrees or 60 degrees. Depending on the desired radial stress, the friction coefficient may be varied from 0.1 to 0.3, or from 0.2 to 0.4, or greater than 0.4, e.g. up to 1.0.

The two lowermost sets of data points 405, 407 (shown as filled triangles) indicate the calculated radial stress in the inner stacks 201B-E for wedge angles of 1 degrees and 3 degrees respectively (the same wedge angle being used for each wedge member 301A-D). The calculated radial stress decreases monotonically with increasing friction coefficient for the wedge angle of 1 degrees (data points 405), but reaches a minimum value at a friction coefficient of 0.2 for the wedge angle of 3 degrees. Calculations of the radial stress for wedge angles of 2, 4 and 5 degrees provide values that are generally between the values obtained for wedge angles of 1 and 3 degrees.

A target maximum radial stress of 350 MPa in the outer stacks of HTS tape 201A,F can be achieved using a friction coefficient of 0.3 and wedge angles greater than 1 degree.

Figure 5:
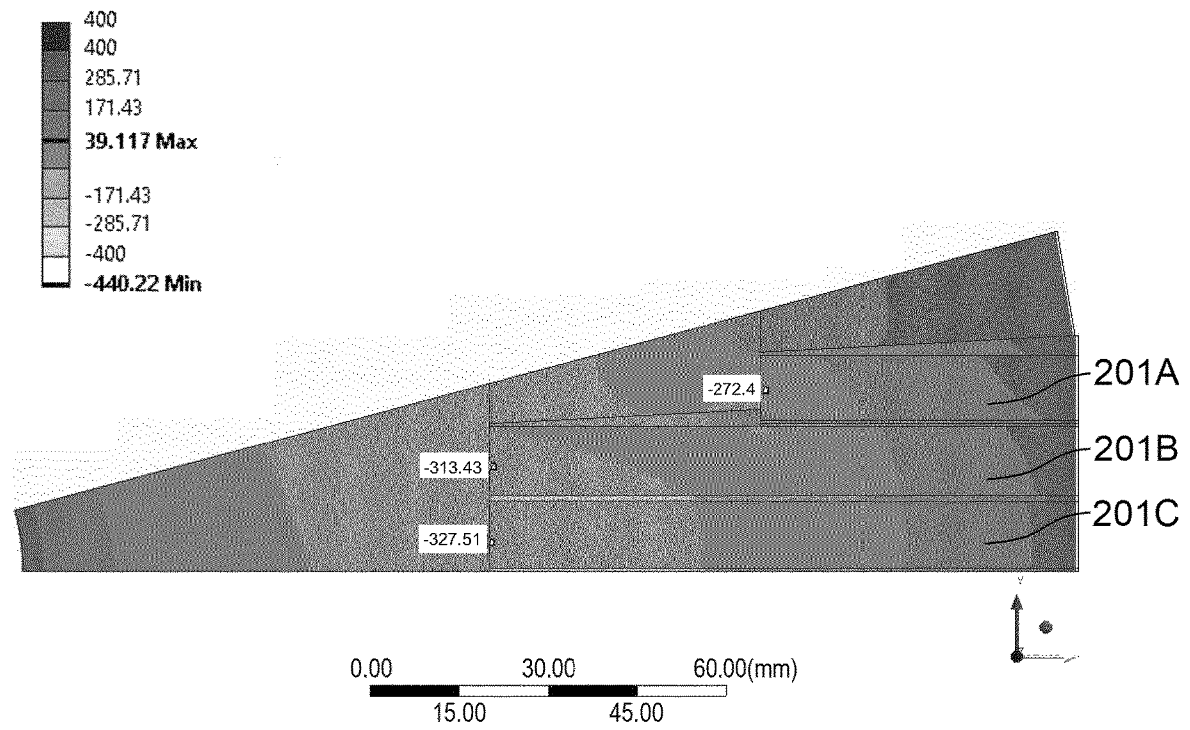
FIG. 5 is a contour plot showing the stress obtained from the FEM calculation.
Figure 6:
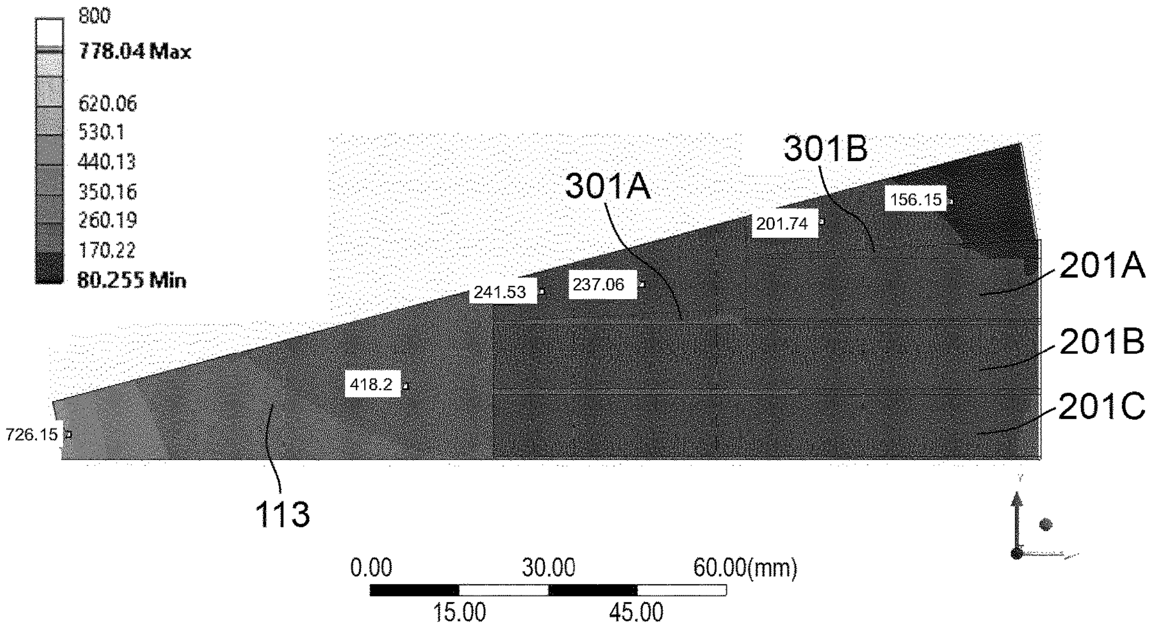
FIG. 6 is a contour plot of the von-Mises stress calculated from the FEM calculation.

FIGS. 5 and 6 show contour plots of the calculated radial stress and the calculated Von Mises stress within an axial cross section of the central column 300, calculated for a wedge angle of 3 degrees and a friction coefficient of 0.3. The calculation is performed for one half of the angular segment shown in FIG. 3 for computational efficiency, with boundary conditions applied to enforce the symmetry of the FEM solution with respect to the symmetry of the central column 300.

The radial stress within the stacks of HTS tapes 107 is calculated to be less than 400 MPa. The maximum values of the radial stress for each of the stacks of HTS tape 201A-C are located at the radially innermost faces of the stacks with calculated values of 272.4 MPa for stack 201A, 313.43 MPa for stack 201B and 327.51 MPa for stack 201C.

The calculated Von Mises stress in the support member 113 is mostly below about 240 MPa adjacent to the wedge members 301A, B. This is sufficiently low that optionally cooling holes can be provided in this part of the central column 300, i.e. between the channels 115 and extending parallel to the axis A-A', without weakening the central column excessively.

Although the above description has focussed on a central column comprising HTS tape, other forms of HTS material such as wires can also be used or LTS materials can be used instead of, or as well as, HTS material. The HTS tapes may be "potted", e.g. by encasing the stack of HTS tapes in solder.

Although the present disclosure is exemplified by a central column for a toroidal field coil (such as for a tokamak plasma chamber), that many other applications are possible that do not involve toroidal field coils. For example, the electromagnets may be used in aerospace applications, included in aircraft, unmanned aerial vehicles, satellites, spacecraft, rocket-propelled vehicles and autonomous exploration vehicles. Indeed, it will be appreciated that the use of wedged surfaces/wedged members described above may be used generally to reduce (or at least redistribute) the stress on an electrical conductor forced against a support member. Such use of wedged surfaces/wedged members is particularly beneficial for superconductor (LTS and/or HTS) materials that degrade or work less efficiently at stresses above a threshold.

The invention claimed is:

1. An electromagnet comprising one or more channels, each channel having provided therein:

a conductor element including one or more layers of superconductor material for conducting electrical current along an axis of the channel, the conductor element being arranged to contact first and second sidewalls of the channel through respective first and second wedge surfaces that are inclined with respect to one another such that a Lorentz force biasing the conductor element in a direction perpendicular to the axis generates opposing contact forces on the first and second wedge surfaces that act to compress the conductor element along a direction with a component perpendicular to the Lorentz force.

2. An electromagnet according to claim 1, wherein each conductor element includes one or more stacks of High Temperature Superconductor, HTS, tapes, each HTS tape including a layer of HTS material extending along the axis of the channel.

3. An electromagnet according to claim 2, wherein the HTS material is ReBCO.

4. An electromagnet according to claim 2, wherein each conductor element includes a first wedge member provided between the stack of HTS tapes and one of the sidewalls of the channel, the first wedge surface being provided on the first wedge member.

5. An electromagnet according to claim 4, wherein the first wedge member is fixed to the stack of HTS tapes.

6. An electromagnet according to claim 4, wherein the first wedge member includes a surface in contact with the stack that is substantially perpendicular to the layers of HTS material.

7. An electromagnet according to claim 6, wherein, for one or more of the conductor elements, an acute angle between the first wedge surface and the surface in contact with the stack is greater than 1 degree.

8. An electromagnet according to claim 7, wherein each conductor element includes a second wedge member attached to the one or more stacks of HTS tapes, the second wedge surface being provided on the second wedge member.

9. An electromagnet according to claim 1, wherein a static friction coefficient between each of the wedge surfaces of the conductor element and the sidewalls of the channel is greater than 0.1.

10. An electromagnet according to claim 1, wherein each of the conductor elements is potted.

11. An electromagnet according to claim 1, further includes a support member, the channels being provided in the support member, the support member includes one or more through holes extending in a direction having a component parallel to one or more of the channels.

12. An electromagnet according to claim 11, wherein the one or more holes are located adjacent one or more of the sidewalls of the channel.

13. A central column for a toroidal field coil of a tokamak plasma chamber, the central column includes a plurality of electromagnets according to claim 1, the channels being spaced around a central axis and the one or more layers of superconductor material being arranged for conducting electrical current parallel to the central axis, wherein the Lorentz force is a radial force biasing the conductor element towards the central axis.

14. A central column according to claim 13, wherein the channels are provided in a single support member.

15. A central column according to claim 13, includes one or more holes through the or each support member, each hole extending parallel to the central axis.

16. A central column according to claim 15, wherein the one or more holes are located radially outwards of a radially inner edge of the conductor element.

17. T A central column according to claim 13, wherein the or each support member includes one or more removable angular segments, each angular segment includes one or more of the plurality of channels.

18. A central column for a toroidal field coil of a tokamak plasma chamber, the central column comprising a support member having a plurality of channels spaced around a central axis, each channel having provided therein a conductor element including one or more layers of superconductor material for conducting electrical current parallel to the central axis, the conductor element being arranged to contact first and second sidewalls of the channel through respective first and second wedge surfaces that are inclined with respect to one another such that a radial force biasing the conductor element towards the central axis generates opposing contact forces on the first and second wedge surfaces that act to compress the conductor element along a direction with a component perpendicular to the radial force.

19. A toroidal field coil for a tokamak, the toroidal field coil includes a central column according to claim 13.

20. A tokamak includes a toroidal field coil according to claim 19.

* * * * *